United States Patent [19]

Kita

[11] Patent Number: 4,910,817
[45] Date of Patent: Mar. 27, 1990

[54] JOINT STRUCTURE FOR FABRIC WEB HAVING HIGH MODULUS OF ELASTICITY

[75] Inventor: Tetsuo Kita, Saitama, Japan

[73] Assignee: Honda Giken Kogyo Kabushiki Kaisha, Tokyo, Japan

[21] Appl. No.: 300,781

[22] Filed: Jun. 12, 1989

Related U.S. Application Data

[62] Division of Ser. No. 8,961, Jan. 30, 1987, abandoned.

[30] Foreign Application Priority Data

Feb. 5, 1986 [JP] Japan .................................. 61-14495
Apr. 22, 1986 [JP] Japan .................................. 61-59573
Apr. 22, 1986 [JP] Japan .................................. 61-59574

[51] Int. Cl.$^4$ ............................................ A47C 23/05
[52] U.S. Cl. ........................................ 5/246; 5/195;
160/DIG. 15; 297/452; 156/163; 156/215
[58] Field of Search ................... 5/246, 191, 194, 195,
5/196, 402, 403, 404, 405, 407, 487; 403/209,
270; 156/160, 163, 215, 202; 160/DIG. 15, 378,
400, 383, 385, 386, 387, 388, 389; 297/452, 460

[56] References Cited

U.S. PATENT DOCUMENTS

| | | | |
|---|---|---|---|
| 2,833,342 | 5/1958 | Swenson | 5/407 |
| 3,586,375 | 6/1971 | Rathbun | 297/452 |
| 4,370,002 | 1/1983 | Koepke | 5/403 |
| 4,583,783 | 4/1986 | Kanai | 160/DIG. 15 |
| 4,684,419 | 7/1987 | Agosta | 156/202 |
| 4,685,738 | 8/1987 | Tinus | 160/DIG. 15 |

. FOREIGN PATENT DOCUMENTS 591261  8/1947  United Kingdom ....... 160/DIG. 15

Primary Examiner—Alexander Grosz
Assistant Examiner—Eric K. Nicholson
Attorney, Agent, or Firm—Lyon & Lyon

[57] ABSTRACT

A fabric web having a high modulus of elasticity is used as a spring element in an upholstered article such as a seat or a bed. The fabric web is joined to a metal rod serving as a frame member of the upholstered article by an end portion of the fabric web, which is folded on itself over the metal rod to provided folded and unfolded layers that are united together by means of a heat-fusible resin film. The heat-fusible resin film is held against the inner surface of the folded end portion of the fabric web and fused by high-frequency welding. The folded end portion of the fabric web is protected by the intermediary film against damage which would otherwise be caused by abrasive contact with a rust layer on the metal rod. The film sandwiched between the folded and unfolded layers has opposite ends folded and fused over the unfolded layer of the fabric web for reinforcing marginal edges of the fabric web. The film is stretched for molecular reorientation to provide increased mechanical strength in the direction in which the fabric web is tensioned during use of the upholstered article.

4 Claims, 7 Drawing Sheets

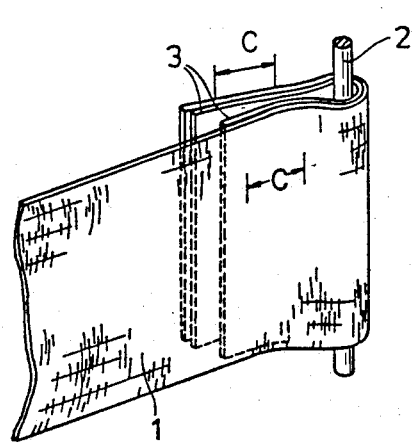
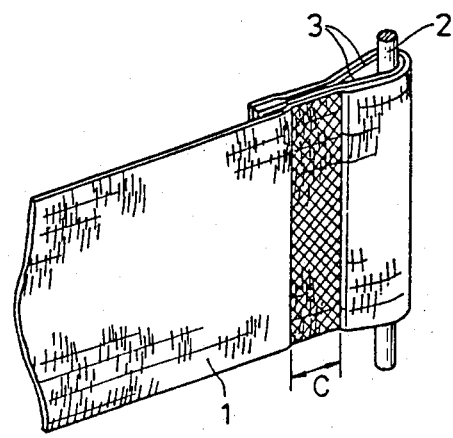
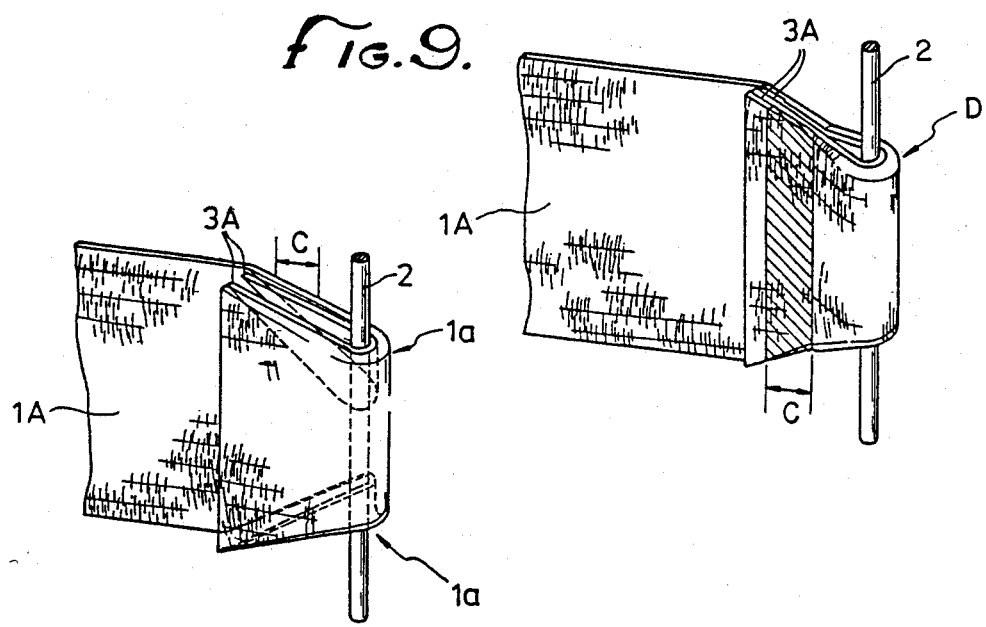

JOINT STRUCTURE FOR FABRIC WEB HAVING HIGH MODULUS OF ELASTICITY

This is a division of application Ser. No. 008,961, filed Jan. 30, 1987 now abandoned.

BACKGROUND OF THE INVENTION

The present invention relates to a fabric web having a high modulus of elasticity used as a spring element in an upholstered article such as a seat or a bed, for example, and more particularly to a joint structure for joining such a fabric web to a metal rod serving as a frame member of such an upholstered article.

FIG. 1 of the accompanying drawings illustrates, partly cut away, a conventional upholstered seat comprising a seat frame 01 supporting a plurality of zigzag metallic springs 02 between opposite frame members thereof. The upholstered seat also includes padded cushioning members 03 placed on the springs 02 and each covered with a cover layer 04.

Another known upholstered seat, shown in FIG. 2, has a seat frame 05, a plurality of parallel fabric webs 06 of a high modulus of elasticity, woven of polyester yarns, and padded cushioning members 07 placed on the fabric webs 06 and each covered with a cover layer 08. The upholstered seat of FIG. 2 is lighter than the seat of FIG. 1 because no metallic springs are employed in the seat.

FIG. 3 shows still another upholstered seat of a conventional design. The upholstered seat of FIG. 3 is similar to the seat of FIG. 2 except that wider fabric webs 09 are supported by a plurality of wires 010 on the seat frame 05.

In each of the upholstered seats illustrated in FIGS. 2 and 3, each end of each of the fabric webs 06, 09 is folded on itself over a metal rod 011 (shown in FIGS. 3 and 4) which is fastened to the wires 010 or which is a member of the seat frame 05 (FIG. 2). A heat-fusible resin film 012 (FIG. 4) is interposed between the folded end and the unfolded body of the fabric web, and then focused by the high-frequency heating process to join the folded end and the unfolded body of the fabric web. The fabric web is thus fastened to the metal rod 011.

The above known joint structure is however disadvantageous as follows: If the metal rod is not subject to surface treatment, rust tends to be produced on the surface of the metal rod. While the upholstered seat is in repeated use, the fiber surfaces of the fabric webs 06, 09 are abraded by the rust layer, and rust particles are caused to enter between the fibers of the fabric webs, with the result that the fabric webs 06, 09 will be reduced in durability.

As shown in FIGS. 4 and 5, the fabric web is typically woven of weft yarns 013 extending in the direction of the arrow A in which the fabric web is kept under tension and warp yarns 014 which alternately overlie and underlie the weft yarns 013 perpendicularly thereto. Generally, the warp yarns 014 are made of nonelastic fibers such as polyester fibers and the weft yarns 013 are made of highly elastic fibers such as polyester elastomer fibers that are much more elastic than the warp yarns 14. When the fabric web 06, 09 is tensioned in the direction of the arrow A such as by the user sitting on the upholstered seat, the fabric web is stressed mainly at opposite marginal edges of a fused transverse area B near the metal rod 011. During repeated application of the stress to the marginal edges of the area B, the weft yarns 013 in the marginal edges are liable to unravel off the warp yarns 014, allowing the marginal edges to be disintegrated. Accordingly, the fabric web 06, 09 has a low degree of durability.

Another problem is that when the fabric web 06, 09 is tensioned, the weft yarns 013 are stretched and so is the heat-fusible resin film 012 which bears the stress applied to the area B of the fabric web. If the tensile strength of the heat-fusible resin film 012 were not high enough, it would be torn apart thereby to force the fabric web off the metal rod 011. The upholstered seat would thus be less durable.

SUMMARY OF THE INVENTION

It is an object of the present invention to provide a joint structure for joining a fabric web having a high modulus of elasticity to a frame member such as a metal rod with an increased degree of durability.

Another object of the present invention is to provide a joint structure for a fabric web having a high modulus of elasticity, the joint structure preventing fibers from unraveling in an area where the fabric web is subjected to repeated stress.

Still another object of the present invention is to provide a joint structure for a fabric web having a high modulus of elasticity, the joint structure being arranged to increase the tensile strength of a heat-fusible resin film fused between folded layers of the fabric web.

According to the present invention, there is provided a joint structure for joining a fabric web as a spring element to a metal rod in an upholstered article, comprising a metal rod, a fabric web having a high modulus of elasticity having an end portion folded on itself over the metal rod, providing folded and unfolded layers of the fabric web on opposite sides of the metal rod, and a heat-fusible resin film held against one surface of the end portion of the fabric web and folded around the metal rod so as to be interposed between the end portion and the metal rod, the heat-fusible resin film being fused to unite the folded and unfolded layers of the fabric web.

According to another embodiment of the present invention, there is also provided a joint structure for joining a fabric web as a spring element to a metal rod in an upholstered article, comprising a metal rod, a fabric web having a high modulus of elasticity having an end portion folded on itself over the metal rod, providing folded and unfolded layers of the fabric web on opposite sides of the metal rod, and a heat-fusible resin film sandwiched between the folded and unfolded layers of the fabric web and having opposite ends folded over marginal edges of the unfolded layer, the heat-fusible resin film being fused to unite the folded and unfolded layers of the fabric web.

According to still another embodiment of the present invention, there is also provided a joint structure for joining a fabric web as a spring element to a metal rod in an upholstered article, comprising a metal rod, a fabric web having a high modulus of elasticity having an end portion folded on itself over the metal rod, providing folded and unfolded layers of the fabric web on opposite sides of the metal rod, and a heat-fusible resin film sandwiched between the folded and unfolded layers of the fabric web and stretched for molecular orientation to provide increased mechanical strength in a direction in which the fabric web is subject to tension, the heat-fusible resin film being fused to unite the folded and unfolded layers of the fabric web.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a fragmentary perspective view showing the manner in which a fabric web is to be joined to a metal rod by a joint structure of the present invention;

FIG. 7 is a fragmentary perspective view of the fabric web of FIG. 6 which has been joined to the metal rod;

FIG. 8 is a fragmentary perspective view showing the manner in which a fabric web is to be joined to a metal rod by a joint structure according to another embodiment of the present invention;

FIG. 9 is a fragmentary perspective view of the fabric web of FIG. 8 which has been joined to the metal rod;

DESCRIPTION OF THE PREFERRED EMBODIMENTS

Figure 1:
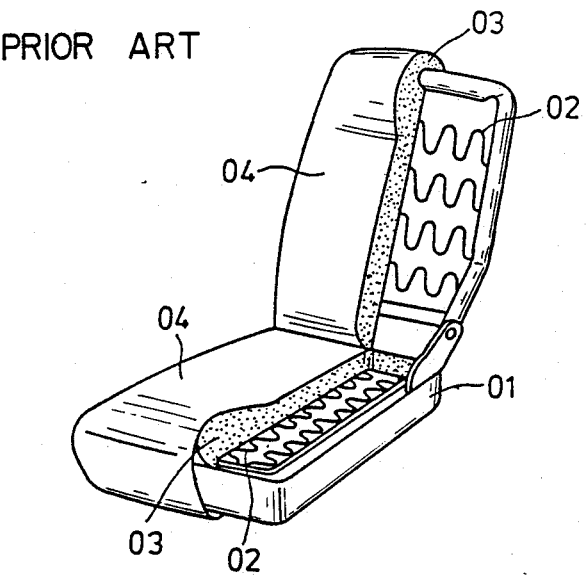
FIG. 1 is a perspective view, partly cut away, of a conventional upholstered seat.

Like or corresponding parts are denoted by like or corresponding reference characters throughout several views.

Figure 2:
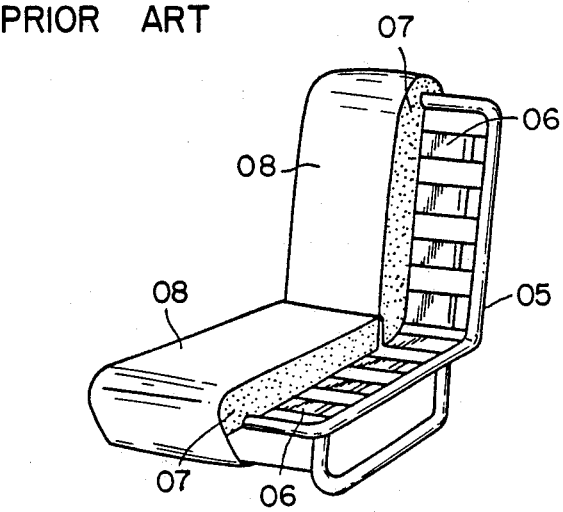
FIG. 2 is a perspective view, partly cut away, of another conventional upholstered seat.
Figure 3:
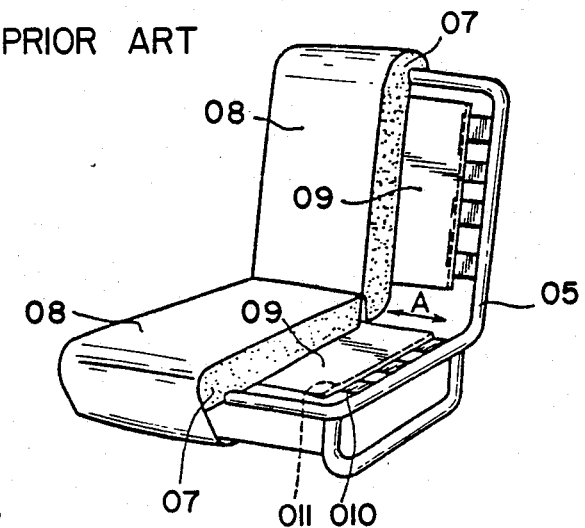
FIG. 3 is a perspective view, partly cut away, of still another conventional upholstered seat.
Figure 4:
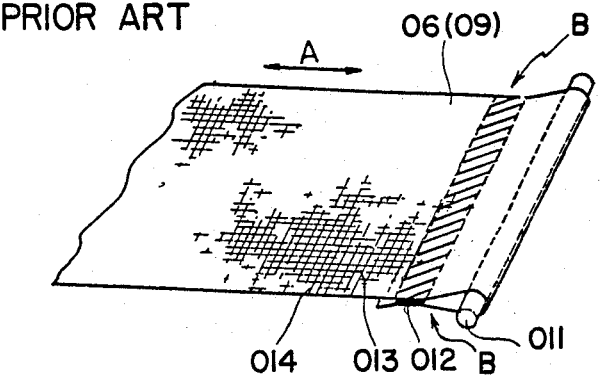
FIG. 4 is a fragmentary perspective view of a fabric web employed in the seats shown in FIGS. 2 and 3.
Figure 5:
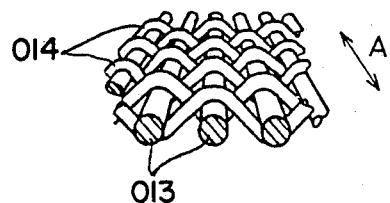
FIG. 5 is an enlarged fragmentary perspective view of a portion of the fabric web illustrated in FIG. 4.

FIGS. 6 and 7 show a fabric web joint structure according to an embodiment of the present invention. A fabric web 1 having a high modulus of elasticity is used as a spring element in an upholstered article such as a seat as shown in FIGS. 2 and 3.

The fabric web 1, which is typically, but not necessarily, of a woven structure, has each end portion (only one shown) having one surface against which a heat-fusible resin film 3 such as a vinyl chloride resin film is held. Then, the end portion is folded on itself over a metal rod 2 with the heat-fusible resin film 3 in contact with the metal rod 2. While the folded end layer of the film 3 is being held in intimate contact with the unfolded film end layer, the film 3 is fused by a high-frequency welder (not shown) over an area C. In the area C, the fused mass of the film 3 enters the interstices of the folded portion of the fabric web 1 and the unfolded layer thereof, thus firmly interconnecting them, so that the fabric web 1 is securely fastened to the metal rod 2.

Since the film 3 is interposed between the metal rod 2 and the fabric web 1, keeping the fabric web 1 out of direct contact with the metal rod 2, the fabric web 1 is not adversely affected by any rust on the metal rod 2 and hence remains highly durable.

FIGS. 8 and 9 show a fabric web joint structure according to another embodiment of the present invention. A fabric web 1A has an end portion folded on itself over the metal rod 2 and including opposite edges 1a folded on themselves toward each other around the metal rod 2. The folded edges 1a extend on opposite sides of the metal rod and are tapered toward the metal rod 2. A heat-fusible resin film 3A is applied to the inner surface of the folded end portion of the fabric web 1A around the metal rod 2, and is then fused in an area C by a high-frequency welder to join the fabric web 1A to the metal rod 2. The joint structure of FIGS. 8 and 9 with the folded edges 1a is reinforced at a folded loop portion D which is subject to the largest load during use of the seat. The durability of the fabric web 1A of FIGS. 8 and 9 is high because of the reinforced folded loop portion D as well as the film 3A disposed inwardly of the folded end portion of the fabric web 1A in direct contact with the metal rod 2.

Figure 10:
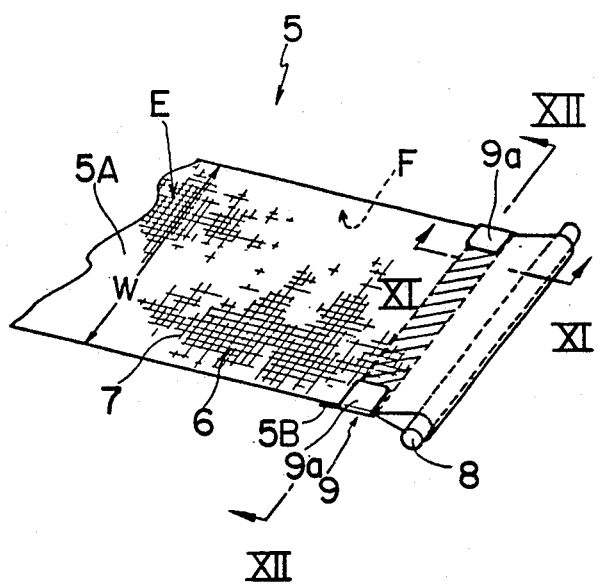
FIG. 10 is a fragmentary perspective view of a fabric web joint structure according to still another embodiment of the present invention.
Figure 11:
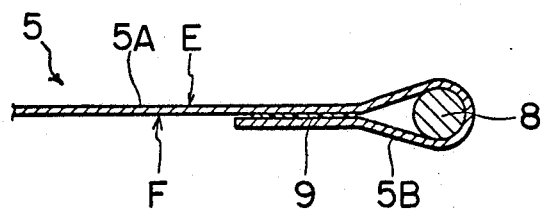
FIG. 11 is an enlarged cross-sectional view taken along line XI—XI of FIG. 10.

FIG. 10 shows a joint structure according to still another embodiment of the present invention. A fabric web 5 is woven of weft yarns 6 and warp yarns 7 and has an end portion folded on itself over a metal rod 8. A folded layer 5B and an unfolded layer 5A of the fabric web 5 are integrally interconnected by a heat-fusible resin film 9 which is sandwiched between the layers 5B, 5A and fused by high-frequency welding, as shown in FIG. 11. The film 9 is longer than the width W (FIG. 10) of the fabric web 5 and has opposite end portions 9a folded and fused over marginal edge portions of the unfolded layer 5A in covering relation to portions of the face E of the fabric web 5 (FIG. 12), which is opposite to the back F thereof against which the film 9 is held.

Figure 12:
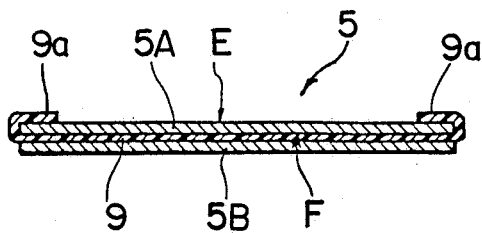
FIG. 12 is an enlarged cross-sectional view taken along line XII—XII of FIG. 10.
Figure 13:
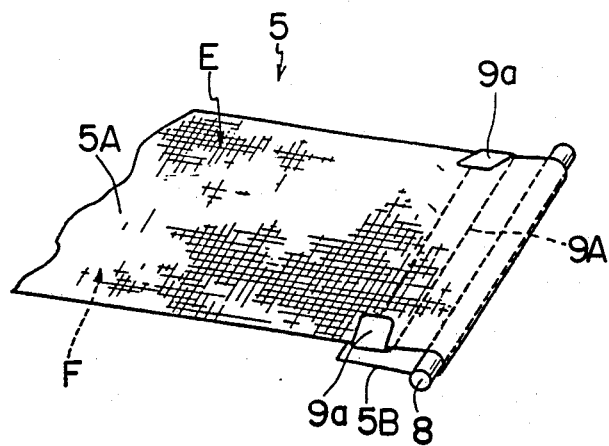
FIG. 13 is a fragmentary perspective view showing the manner in which the joint structure of FIG. 10 is produced.

The joint structure of FIGS. 10 through 12 is produced as shown in FIG. 13. More specifically, a heat-fusible resin film 9A which is longer than the width of the fabric web 5 is applied to the back F of the fabric web 5, and then the opposite end portions 9a are folded around the edges of the fabric web 5 over the face E. The end portion of the fabric web 5 is then folded on itself over the metal rod 8, with the folded layer 5B and the unfolded layer 5A sandwiching the film 9A. Thereafter, the film 9A including its folded end portions 9a is fused by high-frequency welding to integrally connect the layers 5A, 5B of the fabric web 5, which is thus securely joined to the metal rod 8.

Inasmuch as the folded ends 9a of the film 9A are fused to the face E of the fabric web 5 at its marginal edges in the vicinity of the metal rod 8, the weft yarns 6 and the warp yarns 7 are securely united together at the marginal edges of the fabric web 5 near the metal rod 8. Therefore, the woven structure of the fabric web 5 remains intact against unravelling at the reinforced marginal edges of the fabric web 5. This increases the strength of the folded end portion of the fabric web 5 extending around the metal rod 8. The strength of the folded end portion of the fabric web 5 is also increased by the film 9A itself since the film 9A is relatively thick.

Figure 14:
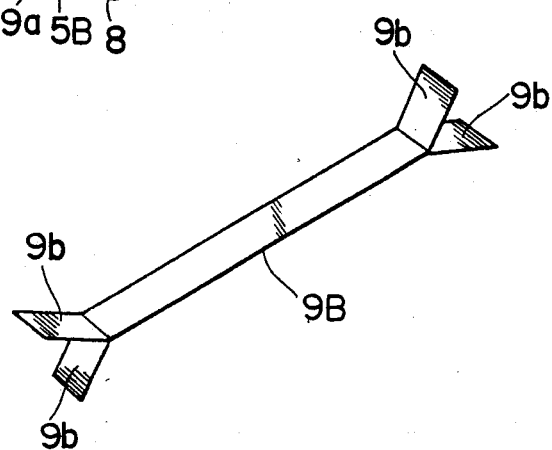
FIG. 14 is a perspective view of a heat-fusible resin film used in a joint structure according to a still further embodiment of the present invention.

FIG. 14 shows a heat-fusible resin film 9B according to a still further embodiment of the present invention. The film 9B has opposite ends each divided into two end portions 9b which will be folded and fused over the respective marginal edges of the folded and unfolded portions 5B, 5A of the fabric web 5. The structure of the film 9B shown in FIG. 14 is effective in making the fabric web more durable.

Figure 15:
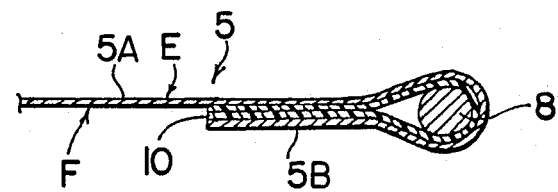
FIGS. 15 and 16 are views similar to FIGS. 11 and 12, respectively, showing a yet still further embodiment of the present invention.
Figure 16:
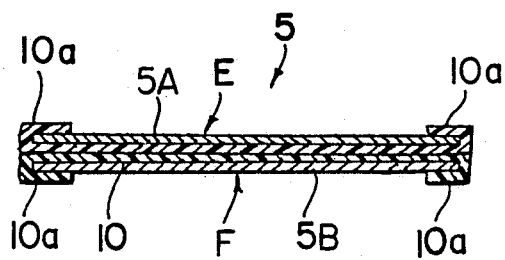

According to a yet still further embodiment of the present invention shown in FIGS. 15 and 16, a heat-fusible resin film 10 is held against one side of the end portion of the fabric web 5, which is folded on itself over the metal rod 8. The film 10 is in direct contact with the metal rod 8, and fused by high-frequency welding to integrally connect the folded and unfolded layers 5B, 5A of the fabric web 5. The film 10 has end portions 10a on its folded and unfolded layers, the end portions 10a being folded over the folded and unfolded layers 5B, 5A. With the arrangement of FIGS. 15 and 16, the fabric web 5 is protected by the film 10 against damage which would otherwise be caused by direct contact with the metal rod 8, and the marginal edges of the fabric web 5 are reinforced with the folded end portions 10a of the film 10.

Figure 17:
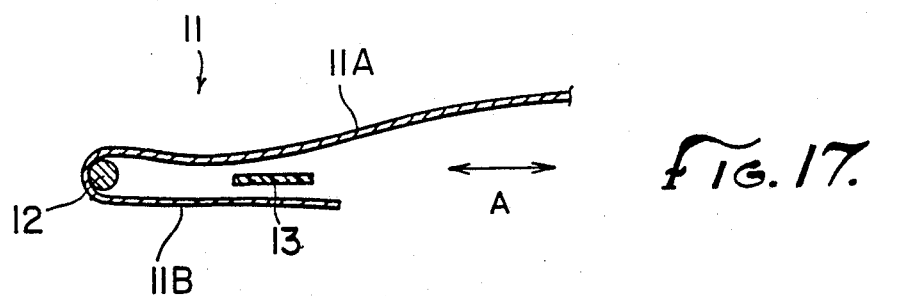
FIG. 17 is a fragmentary cross-sectional view showing the manner in which a fabric web is joined to a metal rod by a joint structure according to another embodiment of the present invention.
Figure 18:
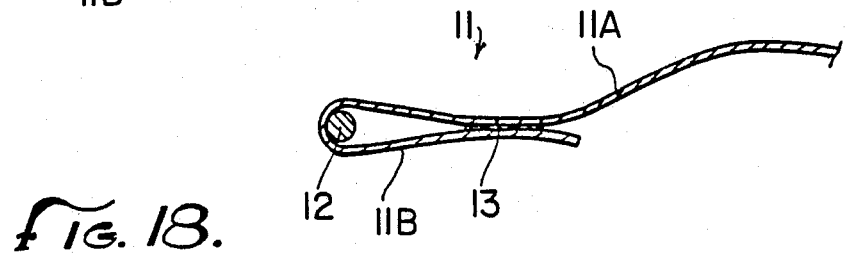
FIG. 18 is a fragmentary cross-sectional view of the fabric web of FIG. 17 joined to the metal rod.

FIGS. 17 and 18 shows a joint structure in accordance with another embodiment of the present invention. In the embodiment of FIGS. 17 and 18, a heat-fusible resin film is produced while it is being stretched at a suitable temperature below its melting point to reorient its molecules and crystal for increasing the mechanical strength. The molecular reorientation may be effected in either biaxial or uniaxial orientation. When the biaxial orientation is employed, one of the two directions in which the film has been stretched is aligned with the direction in which a fabric web with the film applied thereto is tensioned. With the uniaxial orientation relied upon, the direction in which the film has been stretched is aligned with the direction in which the fabric web is subject to tension.

More specifically, as shown in FIGS. 17 and 18, a fabric web 11 of a high modulus of elasticity is folded on itself over a metal rod 12, and a heat-fusible resin film 13 is sandwiched between a folded layer 11B and an unfolded layer 11A of the fabric web 11. At this time, the direction in which the film 13 has been stretched for molecular reorientation is aligned with the direction A in which the fabric web 11 is tensioned. Then, the resin film 13 is fused by high-frequency welding to integrally connect the layers 11A, 11B of the fabric web 11. Alternatively, the film 13 may be connected to the layers 11A, 11B under pressure by an adhesive coated on the opposite surfaces of the film 11. With the film 13 thus oriented with respect to the fabric web 11, the film 13 is mechanically strong and protected against rupture when the fabric web 11 is repeatedly tensioned in the direction of the arrow A in which the weft yarns extend.

If the film 11 were heated by externally applied heat, then the film 11 would lose the molecular reorientation given by the previous biaxial or uniaxial stretching process. However, the molecular reorientation will not be removed if the film 11 is fused by high-frequency welding or high-frequency induction heating.

Figure 19:
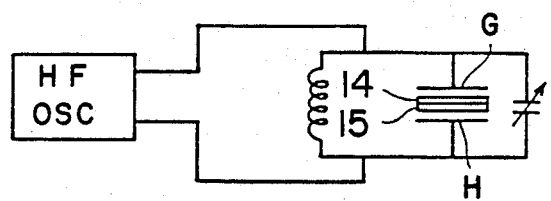
FIG. 19 is a diagram of an arrangement for fusing a resin film between fabric web layers with a high-frequency welder.
Figure 20:
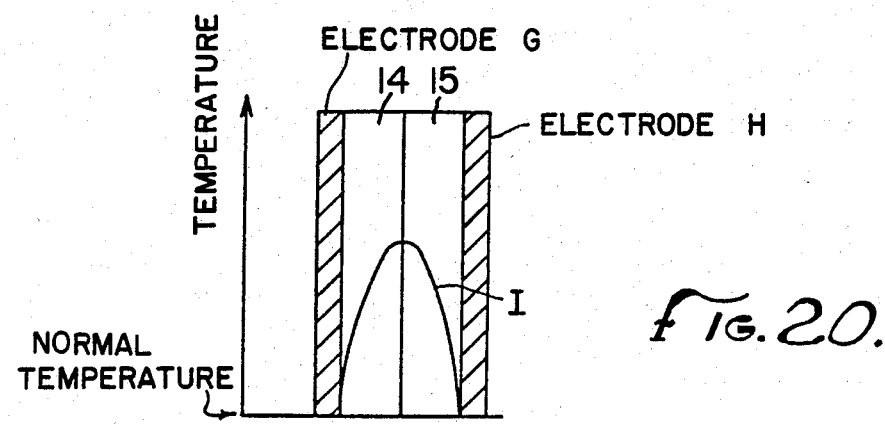
FIG. 20 is a graph showing a temperature distribution curve of the fabric web layers according to high-frequency welding.

Such high-frequency induction heating will be described with reference to FIGS. 19 and 20. As shown in FIG. 19, resin specimens 14, 15 with a large dielectric power factor are placed between electrodes G, H, and subjected to a high-frequency electric field produced between the electrodes G, H. The resin specimens 14, 15 are now heated at their interface and fused by high-frequency induction heating. At this time, pressure is applied to the resin specimens 14, 15 thereby to integrally unite them. As shown in FIG. 20, the temperature rise within the resin specimens 14, 15 is highest at the interface therebetween, and the outer surfaces of the resin specimens 14, 15 are not substantially heated, as indicated by the temperature distribution curve I. Therefore, the molecular reorientation at areas remote from the interface of the resin specimens 14, 15 is not removed by the high-frequency induction heating. As a consequence, when the layers 11A, 11B of the fabric web 11 are united to each other by fusing the film 13 therebetween by high-frequency welding or high-frequency induction heating, the molecular reorientation given to the film 13 is not eliminated.

Figure 21:
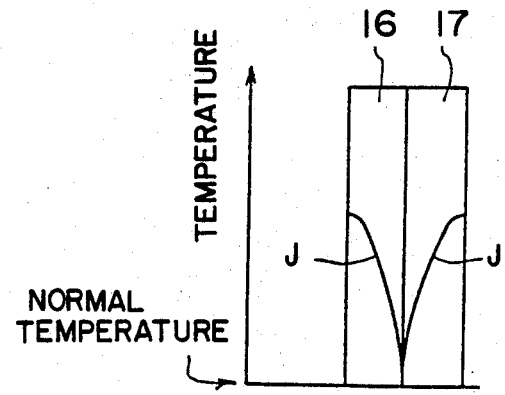
FIG. 21 is a graph showing a temperature distribution curve of fabric web layers according to external heating.

If an external heating process such as the impulse sealing process or the heat sealing process is employed to unite resin specimens 16, 17 (FIG. 21), then the temperature rise is lower at their interface and higher at their outer surfaces, as indicated by the temperature distribution curve J. When the temperature at the interface is sufficiently increased, the entire specimens 16, 17 are fused and their molecular reorientation is lost.

Figure 22:
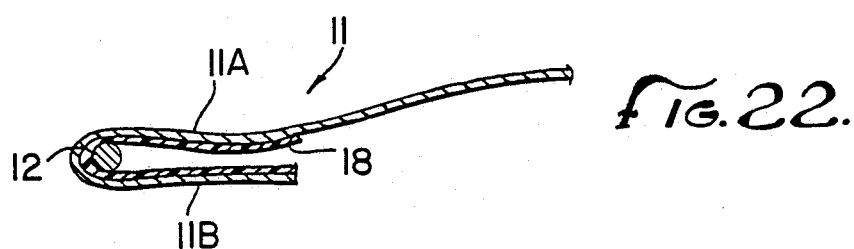
FIGS. 22 and 23 are views similar to FIGS. 17 and 18, respectively, showing still another embodiment of the present invention.
Figure 23:
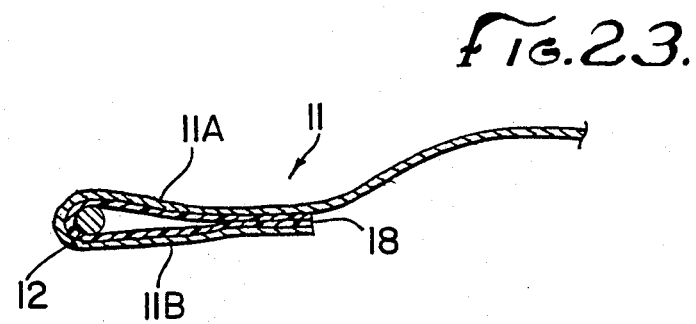

FIGS. 22 and 23 illustrate a joint structure according to still another embodiment of the present invention. In this embodiment, a heat-fusible resin film 18 is applied against one surface of the end portion of fabric web 11, which is folded on itself over the metal rod 12. The film 13 has been stretched for molecular reorientation to provide greater mechanical strength in the direction of the arrow A in which the fabric web 11 is subject to tension. The folded film 18 folded around the metal rod 12 and held against the layers 11A, 11B of the fabric web 11 are fused by high-frequency welding to unite the layers 11A, 11B. Since the film 18 is disposed between the metal rod 12 and the fabric web 11, the fabric web 11 is protected against damage which would otherwise result from direct abrasive contact with the metal rod 12. As a further improvement, the film 18 may be provided with tabs extending laterally beyond the fabric web and folded onto the outer surfaces as shown in FIGS. 12 and 16. Moreover, any of the embodiments of FIGS. 6 through 16 may be improved also by using a heat-fusible resin film that has been subjected to molecular reorientation and similarly orienting the film in the joint structure.

Although certain preferred embodiments have been shown and described, it should be understood that many changes and modifications may be made therein without departing from the scope of the appended claims.

I claim:

1. A joint structure for joining a fabric web as a spring element to a metal rod in an upholstered article, comprising:
    a metal rod;
    a fabric web having a high modulus of elasticity having an end portion folded on itself over said metal rod, providing folded and unfolded layers of the fabric web on opposite sides of said metal rod; and
    a heat-fusible resin film sandwiched between said folded and unfolded layers of the fabric web and having opposite ends folded over marginal edges of said unfolded layer, said heat-fusible resin film being fused to unite said folded and unfolded layers of said fabric web.

2. A joint structure according to claim 1, wherein each of said opposite ends of said heat-fusible resin film has two divided end portions folded over respective marginal edges of said folded and unfolded layers of said fabric web.

3. A joint structure according to claim 1, wherein said heat-fusible resin film is held against one surface of said end portion of the fabric web and folded around said metal rod so as to be interposed between said end portion and said metal rod.

4. A joint structure for joining a fabric web as a spring element to a metal rod in an upholstered article, comprising:
    a metal rod;
    a fabric web having a high modulus of elasticity having an end portion folded on itself over said metal rod, providing folded and unfolded layers of the fabric web on opposite sides of said metal rod; and
    a heat-fusible resin film held against one surface of said end portion of the fabric web and folded around said metal rod so as to be interposed between said end portion and said metal rod, said heat-fusible resin film having opposite ends folded over marginal edges of said unfolded layer, said heat-fusible resin film being stretched for molecular orientation to provide increased mechanical strength in a direction in which said fabric web is subject to tension, said heat-fusible resin film being fused to unite said folded and unfolded layers of said fabric web.

* * * * *